United States Patent [19]

Minnis et al.

[11] Patent Number: 4,970,519
[45] Date of Patent: Nov. 13, 1990

[54] CONTINUOUSLY TRANSMITTING AND RECEIVING RADAR

[75] Inventors: Brian J. Minnis, Crawley; Andrew G. Stove, Reigate, both of England

[73] Assignee: U.S. Philips Corporation, New York, N.Y.

[21] Appl. No.: 437,478

[22] Filed: Nov. 15, 1989

[30] Foreign Application Priority Data

Dec. 7, 1988 [GB] United Kingdom ................ 8828561

[51] Int. Cl.⁵ .......................................... G01S 13/32
[52] U.S. Cl. .............................. 342/165; 342/294;194
[58] Field of Search ................ 342/194, 165, 173, 174

[56] References Cited

U.S. PATENT DOCUMENTS 2,147,810  2/1939  Alford .
2,453,169  11/1948  Varian .
2,520,553  8/1950  Lawson .
3,735,402  5/1973  Mosher .
4,682,175  7/1987  Lazarus .

Primary Examiner—Thomas H. Tarcza
Assistant Examiner—Mark Hellner
Attorney, Agent, or Firm—Robert J. Kraus

[57] ABSTRACT

A CW radar comprises a substantially continuously operable transmitter (10) and receiver (16,18,20), signal operating means (12,14) for radiating the transmitter signal and for receiving at least the return signal and a reflected power canceller (RPC) circuit (26, 28 and 30) for cancelling leakage signals in a signal path from the signal operating means to the receiver. The receiver front end comprises quadrature related mixers (18,20) which supply intermediate frequency signals ($I_1$ and $Q_1$) to a low frequency control loop (32, 34, 36) which supplies at least a pair of control signals ($I_c$, $Q_c$) to a four quadrant vector modulator (28) in the RPC circuit. In order to be able to optimize the cancellation of phase as well as amplitude, the control circuit loop includes means for suynthesizing control vectors ($I_1 - I_1$, $Q_1$ and $-Q_1$) from the outputs of the quadrature related mixers (18,20). Selecting means selects a pair of quadrature related control vectors from those control vectors synthesized on the basis of minimizing leakage in the outputs of the quadrature related mixers (18,20). The selected control vectors ($I_c$, $Q_c$) are applied to the four quadrant vector modulator (28) which preferably comprises a pair of analogue driven biphase modulators (56,58- FIG. 4 (not shown)). In an alternative embodiment (FIG. 7) the four quadrant vector modulator comprises four voltage controlled attenuators to which respective control vectors ($I_c$, $-I_c$, $Q_c$ and $-Q_c$).

13 Claims, 4 Drawing Sheets

CONTINUOUSLY TRANSMITTING AND RECEIVING RADAR

BACKGROUND OF THE INVENTION

The present invention relates to continuously transmitting and receiving radar, for example a continuous wave (CW) radar, and more particularly to the suppression of leakage (otherwise known as feedthrough) in such a radar.

A leakage or feedthrough signal comprises an unpropagated portion of the transmitted energy which is fed directly to the radar receiver resulting in saturation of, damage to and/or degradation of sensitivity of the receiver.

The Radar Handbook (Editor M. I. Skolnik, McGraw-Hill, New York, 1970), pages 16-18 and 16-19 discusses minimisation of feedthrough using a dynamic canceller. All dynamic cancellers depend on synthesising a proper amplitude and phase of a signal at microwave frequencies taken from the transmitter and using this to cancel the feedthrough signal. These pages also mention that microwave feedthrough cancellation is of principal value in preventing saturation and in minimising the effects of AM noise. Because of the correlation effect, FM noise produced by feedthrough tends to cancel in the receiver. Near-in AM and FM noise produced by clutter is also beneficially reduced by a feedthrough servo, since, in nulling out the carrier, it automatically removes both sidebands, whatever their origin, as long as the decorrelation interval is short. Clutter signals from long ranges have both AM and FM noise that is essentially decorrelated, and feed-through nulling of these signals may increase their deviation by a factor of 2 or their power by a factor of 4.

A method of cancelling the effects of noise sidebands present in the leakage signal is disclosed in British Patent Specification No. 2147473B which describes a method of FM noise reduction in a CW radar system. The system comprises a master oscillator, means for transmitting an RF signal derived from the oscillator and for receiving a return signal, and a mixer having a local oscillator port and a signal port. A local oscillator signal is obtained by coupling-out a portion of the master oscillator signal. A leakage signal may reach the signal port of the mixer otherwise than along the propagation path of the local oscillator signal and without being reflected externally of the system, for example by reflection of the signal supplied to the transmitting means. In order to minimise noise in the mixer due to FM noise in the leakage signal, the electrical lengths over the operating frequency range of the system from the master oscillator to the local oscillator port and to the signal port of the mixer of the propagation paths of the local oscillator signal and the leakage signal respectively are made substantially equal, for example by including a delay line in the local oscillator signal path. Since FM noise power decreases with increasing offset from the carrier frequency (that is the transmitted frequency), this known method of noise reduction is particularly suited to alleviating noise at low intermediate frequencies (IFs). Additionally noise reduction systems are particularly useful with frequencies in the millimeter-wave range for which currently available oscillators tend to be rather noisy.

SUMMARY OF THE INVENTION

An object of the present invention is to effectively cancel the leakage signal by minimising phase and amplitude errors between the leakage and cancelling signals in a continuously transmitting and receiving radar.

According to a first aspect of the present invention there is provided a radar comprising a substantially continuously operable transmitter, a substantially continuously operable receiver, signal operating means for radiating the transmitter signal and for receiving at least the return signal, and a reflected power canceller circuit for cancelling leakage signals in a signal path from the signal operating means to the receiver, characterised in that the receiver comprises first and second mixers for producing quadrature related output signals, the first and second mixers having first inputs coupled to the signal path from the signal operating means, second inputs coupled to means for deriving local oscillator signals from the transmitter output, means for quadrature phase shifting one of the signals applied to one of said first and second inputs and outputs, in that the reflected power canceller circuit has an input coupled to the transmitter output, a vector modulator coupled to said input, the vector modulator in operation producing a cancelling signal on an output which is coupled to the signal path from the signal operating means, and in that a control loop is provided for supplying quadrature related control vectors to the vector modulator, the control loop having first and second inputs coupled to the outputs of the first and second mixers respectively, means for optimising at least a pair of quadrature related control vectors derived from the outputs of the first and second mixers on the basis of minimising the leakage in the outputs of the first and second mixers and for supplying the optimised control vectors to the vector modulator.

In an embodiment of the present invention the vector modulator comprises first and second analogue controlled biphase modulators. Normally biphase modulators are digitally controlled but it has been found that controlling such modulators with analogue signals enables an effective and relatively inexpensive vector modulator to be produced.

In an alternative embodiment of the present invention the vector modulator is a four quadrant vector modulator constituted by four voltage controlled attenuators.

If desired the means for optimising the control vectors may comprise means for simulating the equations $$I_c = I_1 \cos \phi + Q_1 \cos \phi$$

and $$Q_c = Q_1 \cos \phi - I_1 \sin \phi$$

where $I_c$ and $Q_c$ are the control vectors, $I_1$ and $Q_1$ are the outputs of the first and second mixers and $\phi$ is the phase error in the reflected power canceller circuit.

Alternatively the means for optimising the control vectors may comprise means for synthesising control vectors from the outputs of the first and second mixers and means for selecting either a pair of quadrature related control vectors or four control vectors having a relative phase difference of 90 degrees between respective pairs from those synthesised on the basis of minimising the leakage in the outputs of the first and second mixers. The means for synthesising the control vectors may comprise means for deriving the outputs of the first and second mixers and the inverted forms of said outputs.

The selecting means may comprise means for determining the levels of the signals in the outputs of the first and second mixers and control means responsive to the determined levels of said signals for selecting the appropriate control vectors.

According to a second aspect of the present invention there is provided a method of reducing the effects of leakage in a radar comprising a substantially continuously operable transmitter, a substantially continuously operable receiver and signal operating means for simultaneously radiating the transmitter signal and receiving a return signal, the method being characterised by deriving a portion of the signal as transmitted, using said portion to form a cancelling signal whose phase and amplitude are adjusted to correspond substantially to that of the carrier leakage, subtracting the cancelling signal from the carrier leakage present in the signal path from the signal propagation means, frequency down-converting the return signal and any residual leakage signal to form in-phase ($I_1$) and quadrature phase ($Q_1$) intermediate frequencies, synthesising in-phase and quadrature related control vectors from the intermediate frequencies, optimising at least a quadrature related pair of the control vectors to minimise the leakage in the intermediate frequencies and by using the optimised control vectors to adjust the phase and amplitude of the cancelling signal.

The optimised control vectors may be used for the analogue control of a pair of biphase modulators or of a four-quadrant vector modulator comprising four voltage controlled attenuators.

BRIEF DESCRIPTION OF THE DRAWING

The present invention will now be explained and described, by way of example, with reference to the accompanying drawing figures, wherein.

In the drawings the same reference numerals have been used to indicate corresponding features.

DESCRIPTION OF THE PREFERRED EMBODIMENTS

Figure 1:
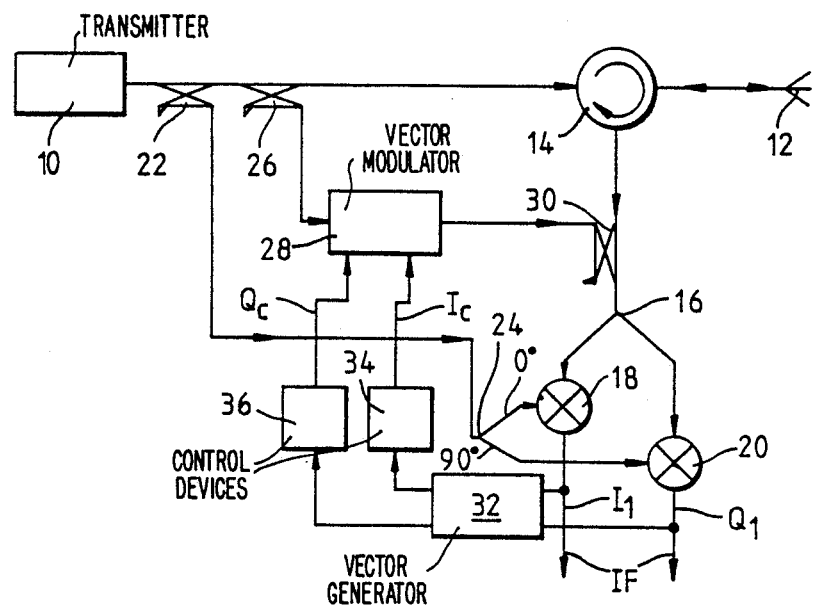
FIG. 1 represents a CW radar having a reflected power canceller.

The CW radar shown in FIG. 1 comprises a transmitter 10 which sends a signal to an antenna 12 by way of a non-reciprocal means, such as a circulator 14, which serves to separate the transmitted and received signals. A receiver front end constituted by a 3 dB power divider 16 and first and second mixers 18, 20 is connected to the antenna 12 by way of the circulator 14. Quadrature related local oscillator signals for the mixers 18, 20 are derived from the transmitted signal using a first directional coupler 22 which is connected to a quadrature phase splitter 24.

The operation of the radar described so far is known and straightforward. The transmitter 10 transmits a continuous wave signal which is reflected from an object within the range of the radar. The reflected or return signal is detected by the antenna and is directed by the circulator 14 to the receiver front end for recovery. The power of the received signal is less than that of the transmitted signal, the relative value being related to the range of the object. If desired, the signal to be transmitted may be frequency modulated with a signal which successively sweeps over a range of frequencies.

A problem with this type of radar is that a small proportion of the transmitter power leaks to the receiver front end by way of the circulator 14 and the antenna mismatch 12 without having been first transmitted. This leakage, if having a high enough signal power, can degrade the sensitivity of the receiver.

In order to reduce or eliminate these effects of leakage, a reflected power canceller circuit is provided. This circuit comprises a second directional coupler 26 which samples the transmitted signal continuously. The sampled signal, which functions ultimately as a cancelling signal, is supplied to a vector modulator 28 which adjusts the phase and amplitude of the signal so as to minimise the carrier leakage. The cancelling signal so formed is supplied to a third directional coupler 30 in the path from the circulator 14 to the power divider 16. The third coupler 30 functions as a subtractor by subtracting the cancelling signal from the leakage signal present in the signal path from the circulator 14.

A control loop is provided between the receiver front end, that is the outputs of the mixers 18, 20 and the vector modulator 28. The control loop includes a vector generator 32 which in response to low frequency $I_1$ and $Q_1$ signals indicative of the residual level of the leakage signal carrier level produces control signals $I_c$ and $Q_c$ which are applied to control devices 34, 36, respectively. The control devices 34, 36 adjust the voltage levels to drive the vector modulator 28 correctly, that is, they provide gain and any necessary offset, and control the frequency response of the loop. The control signals $I_c$ and $Q_c$ produced by the control devices 34, 36 are applied to respective control inputs of the vector modulator 28 thus forming a closed control loop to minimise the level of the detected leakage signal. Using a low frequency signal in the control loop enables it to have a narrow band which has the effect of cancelling the residual level of the carrier present in the leakage signal. If the control loop was a broader bandwidth loop then there is a possibility of wanted as well as unwanted signals being cancelled.

In order to cancel the leakage, not only the amplitude but also the phase of the cancelling signal must be controlled. The mixers 18, 20 provide signals $I_1$, $Q_1$ representative of the amplitudes of those components of the signal at their inputs which are in-phase with and in-quadrature with the derived local oscillator signal. The vector modulator 28 consists of two separate sections controlling separately the I and Q components of the cancelling signal supplied to the third directional coupled 30. In effect two separate control loops cancelling separately the I and Q components of the leakage system are formed.

A problem with having two control loops is that large phase errors and large deviations from the orthogonality between them can degrade the performance of the control loops and lead to instability. Small errors on the other hand can be corrected by the negative feedback of the loops. The limiting value is a phase error of 90 degrees, errors of less than 45 degrees produce only small degradations in the loop performance.

In order to ensure for example that signals controlled by the I channel of the vector modulator 28 give rise to an I output from the mixer 18, the differential path lengths between the circuit parts 22, 26, 28, 30, 16 and 18 for the cancelling signal, and between the circuit parts 22, 24 and 18 for the local oscillator signal must be an integral number of wavelengths. A similar consideration applies in respect of the Q channel.

By way of illustration, for a microwave frequency of 9 GHz, the allowable phase error of 45 degrees corresponds to a path length error of 2.5 mm. This tolerance is not easy to achieve and if the differential path length is many wavelengths long, the differential phase will change if the transmitter frequency is changed. In practice the reflected power canceller may need to be factory adjusted for each unit by adjusting the cable lengths. This will be a time-consuming and therefore expensive task.

The provision of the vector generator 32 provides a means of adjusting phase in the low frequency control circuitry rather than in the microwave part of the circuitry. The adjustment can be effected in a simple manner which can easily be implemented in production and which can be automatically re-adjusted as required.

Figure 2:
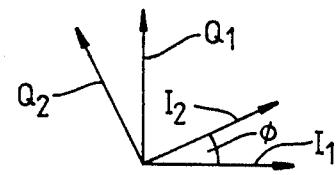
FIGS. 2 and 3 are vector diagrams.

Referring to FIG. 2, the vectors $I_1$ and $Q_1$ represent inputs to the mixers 18 and 20 which give pure I and Q outputs from the respective mixers. $I_2$ and $Q_2$ represent the phase vectors of pure I and Q outputs, respectively, from the vector modulator 28. The angle $\phi$ between the vectors represents the phase error in the circuit. This error may be eliminated by adjusting the microwave path lengths to make the vectors coincide. However as pointed out such an adjustment is critical.

The vector generator 32 synthesises the appropriate vectors to control the vector modulator 28 from combinations of the I and Q outputs of the mixers 18 and 20, respectively. This is effectively the same as changing the local oscillator path lengths, but can be done by generating the functions:

$$I_c = I_1 \cos \phi + Q_1 \sin \phi$$

$$Q_c = Q_1 \cos \phi - I_1 \sin \phi$$

where $\phi$ is the phase error.

Figure 3:
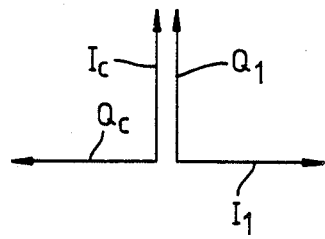

These formulae express the coordinates of a point $I_1, Q_1$ in the rotated coordinate axes parallel to $I_2, Q_2$. FIG. 3 illustrates the case where $\phi = 90$ degrees and $I_c = Q_1$ (parallel to $I_2$) and $Q_c = -I_1$ (parallel to $Q_2$).

In an embodiment of the present invention in which the maximum acceptable setting is 45 degrees, then the rotation, that is the phase shift to be applied to remove the phase error, need only be adjustable in 90 degree steps, thus:

| Rotation (degrees) | $I_c$ | $Q_c$ |
| --- | --- | --- |
| 0 | $I_1$ | $Q_1$ |
| 90 | $Q_1$ | $-I_1$ |
| 180 | $-I_1$ | $-Q_1$ |
| 270 | $-Q_1$ | $I_1$ |

Figure 4:
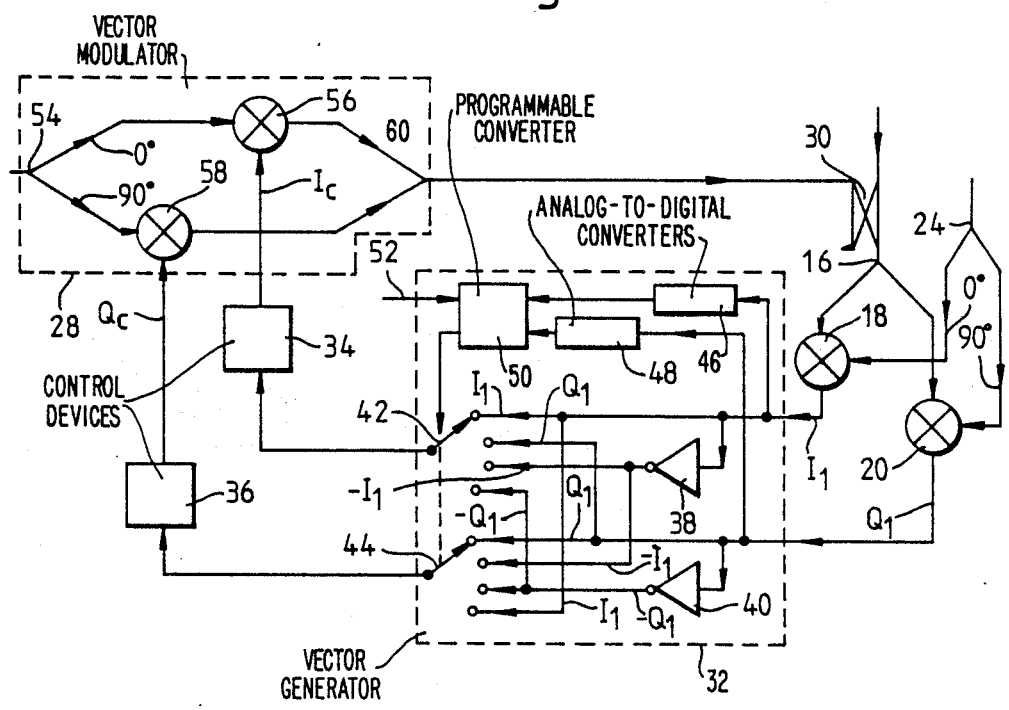
FIG. 4 is a block schematic diagram illustrating the reflected power canceller portion of a CW radar which uses an analogue biphase modulator.

FIG. 4 illustrates the I and Q control loops which include a vector generator 32 capable of generating the above pairs of vectors and a vector modulator 28 implemented by analogue biphase modulators which have been found to be very effective in operation.

Considering the vector generator 32, the mixers 18 and 20 provide the vectors $I_1$ and $Q_1$. The vectors $-I_1$ and $-Q_1$ are provided by inverters 38 and 40. These vectors are applied to respective 4 pole, one way switches 42, 44, whose movable contacts are ganged together, thus the order of the vectors applied to each of the switches 42, 44 is as shown above. The operation of the switches 42, 44 is based on the selection of the best switch positions to minimise $I_1$ and $Q_1$. Minimising the mixer outputs implies minimisation of the residual uncancelled signal, which in turn implies optimum operation of the cancelling loop. The operation of the switches 42, 44 can be done manually. However FIG. 4 illustrates an arrangement for carrying out this operation automatically.

The mixer outputs $I_1$ and $Q_1$ are applied to respective analogue to digital converters 46, 48 which measure the levels of these mixer outputs and apply them to a programmable controller 50 which in turn controls the operation of the switches 42, 44. The programmable controller 50 has a "set loop" input 52 by which the controller 50 can be remotely operated from time to time such as when the transmitter 10 frequency is changed and/or at switch-on of the radar.

The vector modulator 28 comprises a quadrature power divider 54 connected to the second directional coupler 26 (FIG. 1). The 0 degree and 90 degree outputs from the divider 54 are connected to signal inputs of respective analogue biphase modulators 56, 58. Outputs of the modulators 56, 58 are combined in a power combiner 60 which is connected to the third directional coupler 30. The vectors $I_c$ and $Q_c$ selected by the switches 42, 44 have their voltage levels adjusted by the control devices 34, 36 before being applied to the modulators 56, 58, respectively.

Figure 5:
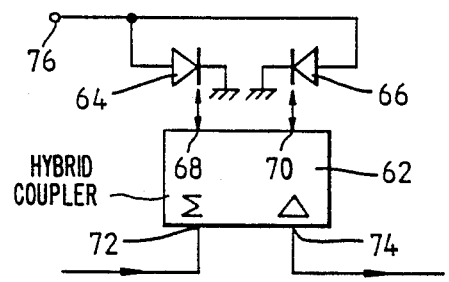
FIG. 5 is a block schematic diagram of a digital biphase modulator.

Each of the analogue biphase modulators 56, 58 comprises a biphase modulator which is normally used digitally to reverse the phase of a microwave signal (change it by 180 degrees) without changing its amplitude. Such a biphase modulator is shown in FIG. 5. It consists of a 3 dB hybrid coupler 62 and two control devices, which are typically PIN diodes 64, 66. The hybrid coupler 62 has two control ports 68, 70 with a 90 degree relative phase shift between them, a sum port 72 and a difference port 74. An input signal enters the sum port 72 of the coupler 62 and is split equally into the two control ports. The input signal is then reflected from the PIN diodes 64, 66 and any signal reflected equally (same amplitude and phase) leaves the coupler by way of the difference port 74. A differential reflection from the PIN diodes 64, 66 leaves as a reflection back through the sum port 72.

A control signal is applied to a terminal 76 which is connected to the anodes of the PIN diodes 64, 66. As the diodes are switched from forward to negative bias, the mismatch which they present to the input signal changes from a short to an open circuit. This change in the mismatch changes the phase of the reflector by 180 degrees and hence changes the phase of the output signal by 180 degrees.

Figure 6:
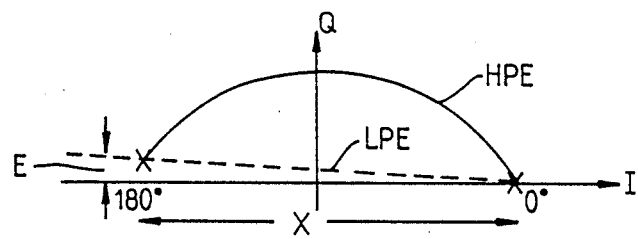
FIG. 6 illustrates the control trajectory for a biphase modulator.

It has now been realised that if the PIN diodes 64, 66 are only partially forward biased, they will no longer present a mismatch to the signal and will absorb some of it, allowing the biphase modulator to be used as a voltage controlled attenuator which not only attenuates the signal from its maximum value to near zero, but also goes on to reverse it and allows it to reach its maximum as a negative value. The biphase modulator can thus be made to act as a four-quadrant multiplier. The operation of the biphase modulator will be described with reference to FIG. 6 of the accompanying drawings. The ordinate represents the quadrature component Q and the abscissa represents the in-phase component I. 0 and 180 degrees represent their respective states and an analogue control region X extends between these two states. LPE indicates the desired trajectory achieved in practice with a low phase error and HPE indicates a hypothetical trajectory with a high phase error which would lead to severe interactions between the I and Q channels and compromise the performance/stability of the loop. These trajectories show the change in output as the PIN diode bias is changed. E represents a finite imperfection which occurs in the 180 degree state. Using these biphase modulators in an analogue mode has been shown to be effective.

Referring to FIG. 4, each of the biphase modulators 56, 58 cannot generate an arbitrary amplitude and phase response and is therefore designed to control the amplitude of either the I and or the Q component alone, with minimal interaction with the other channel. Implementing the vector modulator 28 by using two biphase modulators has been found to be simple and cheap and the montonic control law, that is the LPE trajectory, means that it is simple to drive. In consequence the whole reflected power cancelling loop is stable.

In a non-illustrated variant the vector modulator is implemented using two conventional digital biphase modulators. The biphase modulators will be complicated to drive because when the cross-over point is reached, the biphase modulators must be switched and the sense of the attenuator drive must then be reversed.

Figure 7:
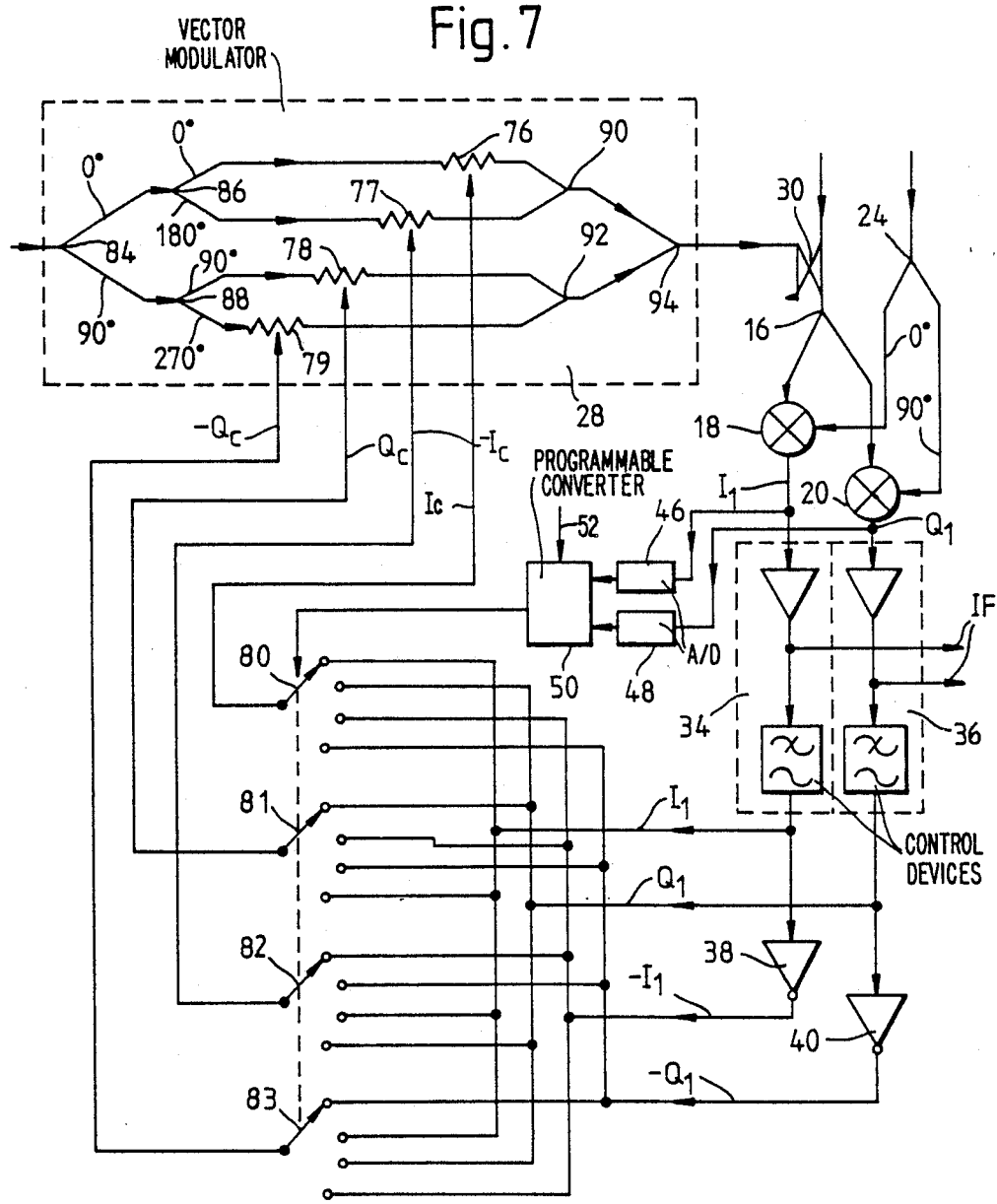
FIG. 7 is a block schematic diagram illustrating the reflected power canceller portion of a CW radar which uses four voltage controlled attenuators.

FIG. 7 illustrates a reflected power cancelling circuit in which the vector modulator 28 is a four quadrant modulator comprising four parallel arranged voltage controlled attenuators 76 to 79 which are controlled by control vectors $I_c$, $-I_c$, $Q_c$ and $-Q_c$, respectively.

These control vectors are produced in a manner not unlike that described with reference to FIG. 4. However as each attenuator 76 to 79 controls a respective quadrant, rather than two quadrants when using the analogue biphase modulators 56,58, it is necessary to provide four control vectors $I_c$, $-I_c$, $Q_c$ and $-Q_c$.

In FIG. 7 the quadrature related outputs $I_1$, $Q_1$ are applied to the control devices 34,36 to have their voltage levels adjusted. Then by means of the inverters 38,40, the signals $-I_1$ and $-Q_1$, respectively, are produced. On the basis that the maximum acceptable setting is 45 degrees, then the rotation, that is the phase shift to be applied to remove the phase error, need only be adjusted in 90 degree steps, thus:

| Rotation (in degrees) | $I_c$ | $Q_c$ | $-I_c$ | $-Q_c$ |
| --- | --- | --- | --- | --- |
| 0 | $I_1$ | $Q_1$ | $-I_1$ | $-Q_1$ |
| 90 | $Q_1$ | $-I_1$ | $-Q_1$ | $I_1$ |
| 180 | $-I_1$ | $-Q_1$ | $I_1$ | $Q_1$ |
| 270 | $-Q_1$ | $I_1$ | $Q_1$ | $-I_1$ |

The desired rotation can be obtained by connecting the signals $I_1$, $-I_1$, $Q_1$ and $-Q_1$ to appropriate inputs of four four-pole one way switches 80 to 83 as shown in FIG. 7. The moving contacts of the switches 80 to 83 are ganged together. The switches 80 to 83, which may be electronic, can be operated manually or automatically using the programmable controller 50.

In operation a signal coupled out by the second directional coupler 26 (FIG. 1) is applied to a 90 degree phase splitter 4. The 0 degree phase signal is applied to a 180 degree phase splitter 86 to whose 0 degree and 180 degree outputs the attenuators 76 and 77, respectively, are connected. The 90 degree phase signal from the phase splitter 84 is supplied to a 180 degree phase splitter 88 whose outputs are at 90 degrees and 270 degrees with respect to 0 degrees. The 90 and 270 degree signals are coupled to the attenuators 78, 79, respectively. Outputs from the four attenuators 76 to 79 are combined using 180 degree power combiners 90, 92 and a 90 degree power combiner 94 whose output is connected to the third directional coupler 30. Compared to the embodiment shown in FIG. 4, the embodiment shown in FIG. 7 requires more components and is, at current component costs, more expensive to implement.

Figure 8:
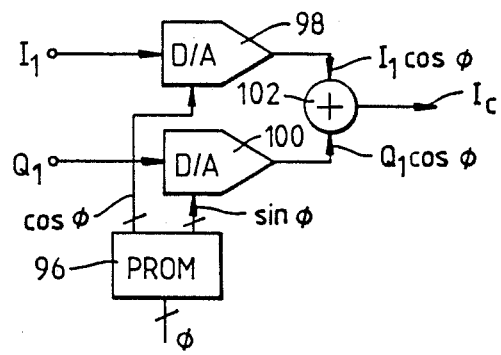
FIG. 8 is a block schematic diagram of an arrangement for deriving phase rotations to any desired resolution.

If it is desired to apply a finer phase control to each of the vector modulator control signals $I_c$ and $Q_c$, then it will be possible to do this by generating the functions referred to earlier in this specification. FIG. 8 illustrates an embodiment for generating $I_c$. A PROM 96 digitally stores the sines and cosines of $\phi$ and supplies these as n-bit signals to digital to analogue converters (DACs) 98, 100, respectively. The values of $I_1$ and $Q_1$ derived from the mixers 18, 20 (FIGS. 1 or 4) are applied to the DACs 98, 100, respectively, whose outputs $I_1 \cos \phi$ and $Q_1 \sin \phi$ are combined in a summing stage 102 to produce the $I_c$ signal in analogue form.

Referring to FIG. 4, the controller 50 may continuously monitor the levels of the error signals $I_1$ and $Q_1$ and, if it senses that they are becoming unacceptably high, implying unacceptably poor loop performance, it may itself request permission from the central radar controller, either an operator or a computer, to readjust the loop. The controller 50 cannot be allowed to do this completely autonomously, because the high error present while various phase combinations are being tried will temporarily upset the performance of the radar and allowance must be made for this happening.

Although the present invention has been described with reference to continuous wave or CW radar, it is applicable also to pseudo CW radar employing a reflected power canceller.

Also separate transmitting and receiving antennas may be
provided, thus avoiding the need for a circulator 14 (FIG. 1). The problem of leakage still nevertheless occurs between the antennas.

We claim:

1. A radar comprising a substantially continuously operable transmitter, a substantially continuously operable receiver, signal operating means for radiating the transmitter signal and for receiving at least the return signal, and a reflected power canceller circuit for cancelling leakage signals in a signal path from the signal operating means to the receiver, characterised in that the receiver comprises first and second mixers for producing quadrature related output signals, the first and second mixers having first inputs coupled to the signal path from the signal operating means to the receiver, second inputs coupled to means for deriving local oscillator signals from the transmitter output, means for quadrature phase shifting one of the signals applied to one of said second inputs, in that the reflected power canceller circuit has an input coupled to the transmitter output, a vector modulator coupled to said input, the vector modulator in operation producing a cancelling signal on an output which is coupled to the signal path from the signal operating means to the receiver, and in that a control loop is provided for supplying quadrature related control vectors to the vector modulator, the control loop having first and second inputs coupled to the outputs of the first and second mixers respectively, means for optimising at least a pair of quadrature related control vectors derived from the outputs of the first and second mixers on the basis of minimizing the leakage in the outputs of the first and second mixers and for supplying the optimised control vectors to the vector modulator.

2. A radar as claimed in claim 1, characterised in that the vector modulator comprises first and second analogue control biphase modulator.

3. A radar as claimed in claim 1, characterised in that the vector modulator comprises first and second digitally controlled biphase modulators.

4. A radar as claimed in claim 1, characterised in that the vector modulator comprises four voltage controlled attenuators responsive to respective ones of the synthesised control vectors.

5. A radar as claimed in claim 1, characterised in that the means for optimising the control vectors comprises means for simulating the equations:

$$I_c = I_1 \cos\phi + Q_1 \cos\phi$$

and $$Q_c = Q_1 \cos\phi - I_1 \sin\phi$$

where $I_c$ and $Q_c$ are the control vectors, $I_1$ and $Q_1$ are the outputs from the first and second mixers and $\phi$ is the phase error in the reflected power canceller circuit.

6. A radar as claimed in any one of claims 1, 2 or 3, characterised in that the optimising means comprises means for synthesising control vectors from the outputs of the first and second mixers and means for selecting a pair of quadrature related control vectors from those synthesised on the basis of minimising the leakage in the outputs of the first and second mixers.

7. A radar as claimed in claim 4, characterised in that the optimising means comprises means for synthesising control vectors from the outputs of the first and second mixers and means for selecting four control vectors having a relative phase difference of 90 degrees between respective pairs from those synthesised on the basis of minimising the leakage in the outputs of the first and second mixers.

8. A radar as claimed in claim 6, characterised in that the means for synthesising the control vectors comprises means for deriving the outputs of the first and second mixers and the inverted forms of said outputs and supplying the outputs and the inverted outputs to the selecting means.

9. A radar as claimed in claim 6, characterised in that the selecting means comprises means for determining the levels of the signals in the outputs of the first and second mixers and control means responsive to the determined levels of said signals for selecting the appropriate control vectors.

10. A method of reducing the effects of leakage in a radar comprising a substantially continuously operable transmitter, a substantially continuously operable receiver and signal operating means for simultaneously radiating the transmitter signal and receiving a return signal, the method being characterised by deriving a portion of the signal as transmitted, using said portion to form a cancelling signal whose phase and amplitude are adjusted to correspond substantially to that of the carrier leakage, subtracting the cancelling signal from the carrier leakage present in the signal path from the signal propagation means, frequency down-converting the return signal and any residual leakage signal to form in-phase ($I_1$) and quadrature phase ($Q_1$) intermediate frequencies, synthesising in phase and quadrature related control vectors from the intermediate frequencies, optimising at least a quadrature related pair of the control vectors to minimise the leakage in the intermediate frequencies and by using the optimised control vectors to adjust the phase and amplitude of the cancelling signal.

11. A method as claimed in claim 10, characterised in that the in-phase and quadrature phase control vectors and their inverted forms thereof are synthesised and the control vectors for use in adjusting the phase and amplitude of the cancelling signal are selected on the basis of minimising the leakage present in the intermediate frequencies.

12. A method as claimed in claim 10 or 11, characterised in that the cancelling signal is produced by analogue control of a pair of biphase modulators.

13. A method as claimed in claim 10 or 11, characterised in that the cancelling signal is produced by analogue control of a quadrant modulator comprising voltage controlled attenuators.

* * * * *